United States Patent Office 3,464,830
Patented Sept. 2, 1969

3,464,830
STORAGE STABLE, READY-TO-SPREAD
FROSTINGS
Isaac J. Wahba, Minneapolis, Minn., assignor to General
Mills, Inc., a corporation of Delaware
No Drawing. Filed Nov. 3, 1966, Ser. No. 591,692
Int. Cl. A23g 3/00
U.S. Cl. 99—139          9 Claims

ABSTRACT OF THE DISCLOSURE

Storage stable, ready-to-spread frostings comprising 40 to 80% by weight sugar, 7 to 21% by weight water and 10 to 20% by weight shortening of improved color retention properties due to the inclusion therein of small amounts of an alkali metal pyrophosphate.

The present invention relates to improved storage stable, ready-to-spread frostings. More particularly, it relates to such frostings having improved color retention properties.

Creme icings or frostings are well known in the art. They principally comprise sugar, shortening, water and optionally flavoring and/or coloring agents in a shortening-water-air emulsion. In the past, these icings or frostings have been made primarily from scratch or from a dry premix by the ultimate user—i.e. the housewife or baker. Accordingly, long-term stability of the frostings was not necessary since the same were spread on cakes and the like which products were consumed in a reasonably short period of time after preparation. Most of these creme frostings have little stability at temperatures ranging between 0° to 100° Fahrenheit, and especially at or above room temperature. By stability is meant the ability of the frosting or icing to retain in large part its foamed cellular structure, to retain in large part its smooth non-granular form, and to separate substantially no liquid during either storage or use.

Recently creme frostings have been produced which have long-term stability. Such frostings are generally prepared from sugar (40 to 80 percent by weight), water (7 to 21 percent by weight) and shortening (10 to 20 percent by weight). The extended stability can be obtained by thoroughly blending and aerating the sugar, water and shortening and then subjecting the resulting blend to high shear. The blending and shearing reduces the size of the shortening and water particles or globules and tends to make all of the particles more uniform in size. Such shearing is accomplished by a number of means including passage of the frosting composition through various homogenizers, colloid mills, dispersion mills and the like. The long term stability of the frostings may also be obtained or further improved by including an emulsifier and/or materials such as pregelatinized starch or cold water soluble pectin which latter materials act as bodying agents by increasing the viscosity of the aqueous phase of the icing emulsion. In addition, the stability and/or palatability of these recently introduced ready-to-spread frostings is also improved by the use of a shortening that retains its plasticity well (i.e. does not appreciably soften or melt) up to about 90° F., that softens relatively rapidly between about 90° F. and 100° F. for better mouthfeel, and that remains sufficiently solid between 100 and 110° F. to give greater emulsion stability.

While the above frostings have been found to be stable for long periods of time, i.e. for many months when stored in closed containers, some of the same have shown color deterioration. It would be highly desirable to be able to produce ready-to-spread frostings which not only have long term stability but also undergo substantially no change in color during preparation, storage or use.

Therefore, it is an object of the present invention to provide improved storage stable, ready to spread frostings. It is a further object of the invention to provide such frostings having improved color retention properties.

It has now been discovered that the color deterioration of storage stable, ready-to-spread frostings can be substantially or completely eliminated by including in such compositions a small amount of an alkali metal pyrophosphate. While the action of the alkali metal pyrophosphates in the frosting compositions is not completely understood and I do not wish to be bound by the following theory, it is believed that the color deterioration of the frostings is caused in some way by the presence therein of heavy metal or alkaline earth metal ions and the alkali metal pyrophosphates inhibit the said color deterioration by sequestering, insolubilizing, precipitating or otherwise inactivating the said ions. The contaminating alkaline earth and heavy metal ions come principally from the water used in the preparation of the frostings although other ingredients and the processing equipment used may also contribute small amounts of such ions to the over-all composition.

The frosting compositions of the present invention comprise 40 to 80% by weight sugar, 7 to 21% by weight water, 10 to 20% shortening and a sufficient amount of an alkali metal pyrophosphate to substantially reduce the deleterious change in color of the frosting during preparation, storage or use. The compositions also preferably include emulsifiers, bodying agents, flavoring, coloring agents, acidulents and the like.

The shortening can be an animal or vegetable oil or fat such as coconut oil, peanut oil, cottonseed oil, soybean oil, corn oil, palm oil, lard, tallow and the like. Such materials may be partially or fully hydrogenated and various mixtures thereof can be used. The lard and the like can be rearranged by well-known procedures. In addition, the shortening can contain freshness preservers or antioxidants and emulsifiers, if desired. It is preferred that the shortening retains its plasticity to an appreciable extent at temperatures in approximately the range of 100 to 110° F. A preferred shortening is a combination of rearranged lard containing about 3% of monoglycerides (alpha monostearate) and a mixture of hydrogenated and partially hydrogenated vegetable oils (soybean and cottonseed oils).

It is preferred to include one or more emulsifiers in the frosting compositions. Such emulsifiers can be any of those commonly employed to emulsify shortening and shortening-water containing compositions. Mono and diglycerides can be used including mono and distearates. The polyalkylene oxide addition products of the higher fatty acid esters of sucrose, sorbitol, sorbitan, glycerol and the like are also preferred emulsifiers. An example of same are the polyoxyethylene derivatives of sorbitan monostearate. Lecithin is also a very useful emulsifier. The emulsifier or emulsifiers not only contribute to the over-all stability of the frostings but in many cases also aid in the aeration thereof and in the spreadability and mouth feel (i.e. smoothness) of the finished product. The emulsifiers are preferably used in amounts of about 0.05 to 4.0% by weight of the frosting.

Various coloring agents can be included. Examples of these materials are FD&C Certified Colors Red #2, Red #3, Yellow #5, Yellow #5 Lake, Yellow #6, Yellow #6 Lake and the like. Mixtures of the coloring agents can be used to obtain different shades of colors in the frostings. Titanium dioxide can be used in small amounts to give opacity to the frosting. Flavoring agents such as salt, vanilla, cream flavor, butter flavor, sweet lemon, lemon juice and the like can be included. And the coloring and flavoring agents can be selected in such a manner to give the frosting flavor and color to simulate natural products—i.e. lemon flavor—yellow color. Acidulents such as citric acid can be included to add tartness and/or control the pH of the frosting. The flavoring agents are preferably used in amounts of about 0.001 to 8% by weight of the frosting. The coloring agents are preferably used in amounts of 0.001 to 2.5% by weight of the frosting. The acidulents are preferably used in amounts of 0.01 to 2.5% by weight of the frosting.

One preferred bodying agent is cold water soluble pectin. Such product may be diluted such as with dextrose to facilitate the handling thereof. Another preferred bodying agent is pregelatinized starch, preferably corn or wheat startch. These agents aid in the control of the consistency or body of the frosting principally by increasing the viscosity of the aqueous phase. The bodying agents are preferably used in amounts of about .01 to 5% by weight of the frosting.

Dextrose and/or dried corn syrup solids are also preferably included to impart smoothness to the finished frosting. One particularly suitable product is available under the trade name Frodex 24 and is prepared by the partial acid hydrolysis of a corn starch suspension under heat and pressure, followed by refining, concentration and drying. This product is also known as maltodextrin and consists of a mixture of dextrose, maltose and dextrins. It not only contributes smoothness but aids in the maintaining of a glossy finish in the finally prepared frosting and retards the recrystallization of the sugar. The maltodextrin is preferably used in an amount of about 0.5 to 10% by weight of the frosting.

Various other minor ingredients can also be included in the frosting compositions. Representative of these materials are non-fat dry milk solids, preservatives such as sorbic acid and potassium sorbate (yeast and mold inhibitors), antioxidants such as butylated hydroxy anisole and the like.

The alkali metal pyrophosphate is preferably sodium acid pyrophosphate. Other representative alkali metal pyrophosphates include potassium acid pyrophosphate, tetrasodium pyrophosphate, tetrapotassium pyrophosphate, and the like. As indicated, the said alkali metal pyrophosphate is used in an amount sufficient to substantially reduce color change of the frosting composition. Amounts as low as 0.004% by weight have been found to reduce the color deterioration or change. Amounts of about 0.04 to 0.4% by weight are preferred. The alkali metal pyrophosphate can be used in amounts above about 0.4% by weight. However, at this higher level, the said compounds give the more delicately flavored frostings an astringent flavor which is not completely desirable.

The frostings of the invention are prepared by intimately blending the above-described ingredients and then preferably subjecting the resulting blend to shear by passage through a homogenizer. In one preferred procedure all of the ingredients except the shortening are preblended and then the shortening is blended into the resulting mixture. After the blending or blending and homogenization steps, the frosting can be sealed in a container, such as a metal can, and stored for long periods of time prior to use as an icing or topping for cakes and the like.

The examples hereinbelow illustrate certain preferred embodiments of the invention without limiting the same thereto.

Example I

The following ingredients were blended in a ribbon mixer:

| Ingredient: | Parts by weight |
| --- | --- |
| Sucrose (fine grind) | 64.75 |
| Water (tap) | 11.50 |
| Maltodextrin (Frodex 24) | 4.00 |
| Non-fat dry milk | 1.05 |
| Mono and diglycerides of stearic acid (about 40% alpha monostearate) | .93 |
| Salt (NaCl) | .54 |
| Titanium dioxide | .35 |
| Lemon flavoring | .37 |
| Cold water soluble pectin (75% dextrose) | .25 |
| Sodium acid pyrophosphate | .20 |
| Potassium sorbate | .15 |
| Polysorbate 60 (polyoxyethylene derivative of sorbitan monostearate containing about 20 oxyethylene groups) | .27 |
| Pregelatinized wheat starch | .15 |
| Citric acid | .12 |
| Lecithin | .10 |
| FD&C Yellow #5 Lake Color | .02 |

After the above ingredients were thoroughly mixed, 15.45 parts shortening was added and thoroughly blended with the other ingredients. The shortening consisted of 7.50 parts rearranged lard containing about 3% by weight alpha monostearate and 7.95 parts of a mixture of hydrogenated and partially hydrogenated vegetable oils (soybean and cottonseed). This shortening remains plastic at temperatures of 100 to 110° F. The resulting blend was then pumped through a Cherry Burrell Series 200 Superhomo homogenizer. The pressure on the first stage of the homogenizer was 2000 pounds per square inch and the pressure on the second stage of the homogenizer was 500 pounds per square inch. The resulting frosting having a specific gravity of 1.10–1.15 was placed in metal containers and sealed. The appetizing yellow color of the frosting did not change to any appreciable extent during mixing or homogenization or after storage for several weeks in the sealed container. The frosting also showed no liquid separation and retained its aerated state and non-graininess during the storage period at ambient room temperature.

Example II

Example I was repeated except that the sodium acid pyrophosphate was eliminated from the composition. The resulting frosting even prior to being sealed in the container had lost a considerable amount of its appetizing yellow color and had acquired a non-appealing grey-green hue.

Example III

Example I was repeated except that the following ingredients were blended, homogenized and sealed in containers as in Example I:

| Ingredients: | Parts by weight |
| --- | --- |
| Sucrose (fine grind) | 64.44 |
| Water (tap) | 11.50 |
| Shortening (as used in Example I) | 15.45 |
| Frodex 24 | 4.00 |
| Non-fat dry milk | 1.05 |
| Mono and diglycerides (as used in Example I) | .93 |
| Salt (NaCl) | .54 |
| Flavoring (vanilla, butter and cream flavors) | .80 |
| Titanium dioxide | .35 |
| Cold water soluble pectin (75% dextrose) | .22 |
| Potassium sorbate | .17 |
| Polysorbate 60 | .26 |
| Pregelatinized wheat starch | .15 |
| Sodium acid pyrophosphate | .10 |
| Lecithin | .10 |
| Citric acid | .03 |
| FD&C Yellow #5 Lake Color | .006 |

The resulting frosting had an appealing cream white color which did not change during mixing, homogenization or after storage. The frosting also had excellent stability.

Example IV

Example III was repeated except that the sodium acid pyrophosphate was eliminated from the composition. The resulting frosting developed an unappetizing greyish hue even before being sealed in the metal container or used as an icing.

As set forth above the frostings of the invention as illustrated by Examples I and III are stable for long periods of time and show little or no color deterioration or change either during preparation, storage or use. They are particularly useful as icings or toppings for cakes and the like. They are easily spread and retain their excellent characteristics for many days even when spread as thin layers on baked products.

It is to be understood that the invention is not to be limited to the exact details of operation or the exact compositions shown and described, as obvious modifications and equivalents will be apparent to those skilled in the art and the invention is to be limited only by the scope of the appended claims.

Now, therefore, I claim:

1. In a storage stable, ready-to-spread frosting comprising 40 to 80% by weight sugar, 7 to 21% by weight water and 10 to 20% by weight shortening, the improvement comprising including in such composition a sufficient amount of an alkali metal pyrophosphate to substantially reduce color change in the said frosting.

2. The frosting of claim 1 wherein the alkali metal pyrophosphate is sodium acid pyrophosphate.

3. The frosting of claim 2 wherein the sodium acid pyrophosphate is used in an amount of about 0.004 to 0.4% by weight.

4. The frosting of claim 1 which also includes an emulsifier.

5. The frosting of claim 4 wherein the emulsifier is selected from mono and diglyceride of higher fatty acids, polyalkylene oxide derivatives of higher fatty acid esters of polyhydric aliphatic alcohols, lecithin and mixtures thereof.

6. The frosting of claim 1 which also includes cold water soluble pectin as a bodying agent and maltodextrin to contribute smoothness to the frosting.

7. The frosting of claim 1 which also includes flavoring and coloring agents.

8. A storage stable, ready-to-spread frosting comprising 40 to 80% sugar, 7 to 21% water, 10 to 20% shortening, 0.004 to 0.4% alkali metal pyrophosphate, 0.05 to 4.0% emulsifier, 0.01 to 8% flavoring, 0.001 to 2.5% coloring agent, 0.01 to 2.5% acidulent, 0.01 to 5.0% bodying agent, and 0.5 to 10.0% maltodextrin, all percents being by weight.

9. The frosting of claim 8 wherein the alkali metal pyrophosphate is sodium acid pyrophosphate, the emulsifier is a mixture of mono and diglycerides of stearic acid, lecithin and polyoxyethylene sorbitan monostearate, the coloring agent is an edible yellow dye, the acidulent is citric acid and the bodying agent is cold water soluble pectin.

References Cited
UNITED STATES PATENTS

| 2,598,282 | 5/1952 | Melnick | 99—139 |
| 2,884,346 | 4/1959 | Korth | 99—139 XR |
| 3,194,666 | 7/1965 | Bedenk et al. | 99—139 |

RAYMOND N. JONES, Primary Examiner

J. M. HUNTER, Assistant Examiner